July 4, 1967     L. STEIN     3,329,040
POSITIVE SAFETY DISENGAGEABLE STEERING COLUMN
Filed Sept. 9, 1966
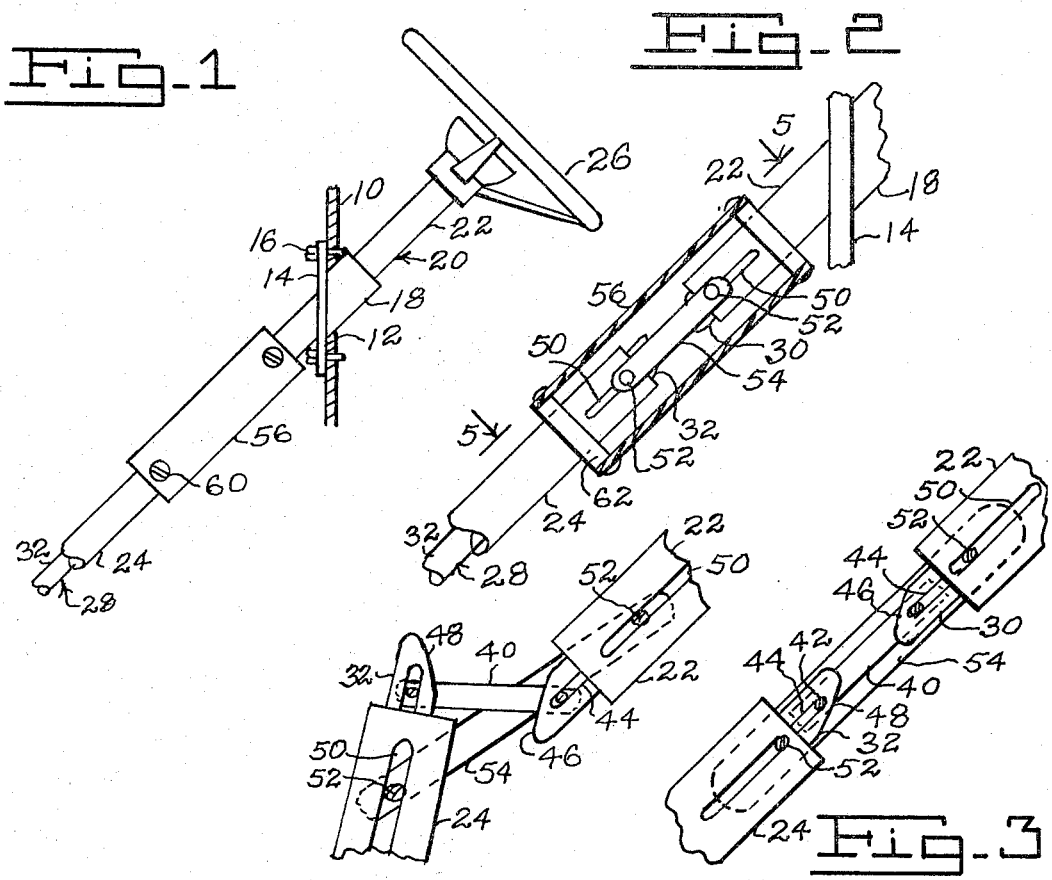
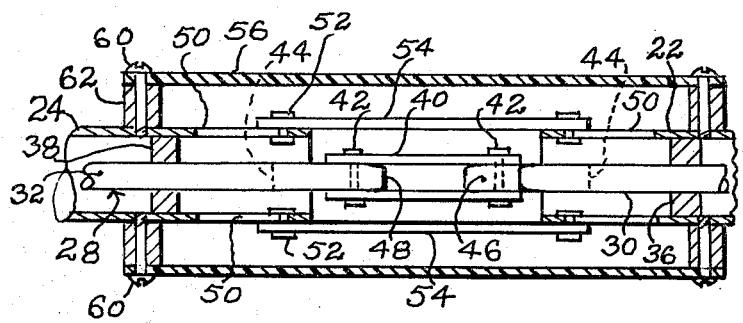
INVENTOR.
Louis Stein
BY Peter Fries, Jr.
ATTORNEY

United States Patent Office 3,329,040
Patented July 4, 1967

3,329,040
POSITIVE SAFETY DISENGAGEABLE
STEERING COLUMN
Louis Stein, Levittown, N.Y., assignor to H. & L. Automotive & Equipment Co., Inc., New York, N.Y., a corporation of New York
Filed Sept. 9, 1966, Ser. No. 578,219
4 Claims. (Cl. 74—493)

ABSTRACT OF THE DISCLOSURE

Steering column construction for motor vehicles, in which the steering column is formed in a plurality of section portions one being connected to the steering linkage of the motor vehicle and the other being connected to the steering wheel, deflection camming means being provided for interconnection of said section portions, so that when the vehicle is in a collision with a fixed object or other vehicle which would normally result in the entire steering column including the steering wheel being pushed rearwardly to injure the driver, a novel camming action is brought into operation, whereby the steering wheel is not subjected to rearward movement, by instantaneous camming deflection of the lower steering column out of axial alignment with the steering wheel, throwing aside the upper middle portion of the steering column lower section and preventing transmission of the axial thrust of the collision, and hence protecting the driver of the vehicle against rearward dangerous movement of the steering wheel toward him.

---

This invention relates to improvements in steering devices for motor vehicles and the like.

An object of the invention is to provide a novel and improved steering device for motor vehicles, in which there is a steering column engageable by suitable linkages to the wheels of the vehicle, for steering them, the steering column being so constructed as to avoid extension during a collision in any manner which might result in personal injury to the driver of the vehicle.

Another object of the invention is to provide a novel and improved steering device for motor vehicles, in which there is a steering column means engageable by suitable linkages to the wheels of the vehicle, for steering them, the steering column means including a plurality of steering column sections, one being engaged with the wheels of the vehicle, another being constructed to carry a steering wheel in the driving portion of the vehicle, and an intermediate interconnecting means engageable with both said column sections for rotation with both, said intermediate interconnecting means being constructed for disengaging said sections from each other upon collision impact of said vehicle with another object, so as to block extension of the steering wheel toward the driver of the vehicle and thus to avoid injury to said driver therefrom.

A further object of the invention is to provide a novel and improved motor vehicle safety construction, which has particular relation to the steering means of the vehicle, with a view to preventing rearward extension of the steering column and steering wheel toward the driver upon impact resulting from a collision with another object or vehicle, the various components of the steering linkage of the vehicle being so constructed that the collision impact results in disengagement of the steering wheel carrying portion of the linkages so that it is unable to transmit the impact forces in a direction toward the driver, and hence he is safeguarded from injury due to such rearward extension which is blocked by the presently disclosed construction.

Still another object of the invention is to provide a novel and improved construction of motor vehicle steering linkage and column, there being a steering wheel mounted adjacent the driver on a steering column, the steering column being formed in a plurality of column section portions one of which carries the steering wheel, another of which as constructed is engaged with the traction wheels of the vehicle through suitable steering linkages, there being intermediate connecting means for connecting said column section portions for rotation together as the operator turns the steering wheel, the construction being such that when a collision occurs, the impact of which is acting to push the steering column portion connected to the traction wheels rearwardly, toward the driver, said intermediate connecting means is so disengaged from connecting said two column section portions together, that the thrust of the impact is not transmitted to the portion carrying the steering wheel, and hence there is no rearward thrust exerted on the steering wheel carrying portion, and hence no push thereof toward the driver from said impact.

Still a further object of the invention is to provide a novel and improved construction of motor vehicle steering means, which is capable of installation in most vehicles without radical structural alteration, for enhancing the safety of the driver in the event of a collision, by blocking rearward displacement of the steering column and steering wheel from a collision, and which device is formed of a few parts, simple in design, and relatively inexpensive to manufacture and install.

These and other objects and advantages of the invention will become apparent from the following description of a preferred embodiment thereof, as illustrated in the accompanying drawings.

In the drawings:

FIGURE 1 is a side elevational view of a steering column and shaft according to the invention.

FIGURE 2 is a fragmentary view similar to FIGURE 1, but sectioned longitudinally partially to show the construction.

FIGURE 3 is a side elevational detail elevational view similar to FIGURE 2 but on a larger scale, and showing portions of the steering shaft and tubular housing in opened spaced normal relationship.

FIGURE 4 is a view similar to that of FIGURE 3 but showing the parts in cammed-apart relationship following a collision impact.

FIGURE 5 is a longitudinal sectional plan view taken substantially on plane 5—5 of FIGURE 2.

In connection with the manufacture, design and use of motor vehicles, many safety factors have been considered to be of considerable importance, especially where there is the ever-present possibility of a collision, either with another vehicle, or which a fixed object, such as a tree, wall, or building. Where the collision is by contact of the front end of the vehicle with the other vehicle or fixed object, then there is the ever present possibility that the impact will be so severe as to push the front end of the vehicle rearwardly by crushing the hood and other body portions thereof, and by pushing rearwardly the engine and/or the steering wheel linkages and the steering column itself. Where the steering wheel is rigidly secured to the steering column, and the steering column or shaft is in one piece, then such impact would have the result of pushing the steering wheel backwards toward the driver, with severe bodily injury possible to the driver. It must be understood that while such collision may occur when the vehicle is in forward motion, it may also occur when the vehicle is standing still on the road or elsewhere, as when another vehicle may at high speed run up against the standing vehicle, pushing the steering column and wheel up against the driver.

The present invention is intended to block such rearward extension of the steering wheel toward the driver, regardless of whether the vehicle is in motion or standing still, where a collision takes place. It may be installed in most vehicles, either as original equipment with a new car, or as replacement equipment in a car already in use, and at low cost without radical reconstruction of the vehicle or change in its mode of operation.

In order to understand clearly the nature of the invention, and the best means for carrying it out, reference may be had to the drawings, in which like numerals denote similar parts throughout the several views.

As shown in the views, there is a portion of a motor vehicle with a fire wall or bulkhead 10 dividing the engine compartment on its left as seen in FIGURE 1 from the interior of the driver's compartment as seen on its right in the same view. There is an opening 12 in the firewall 10, through which is secured a supporting bracket member 14 by means of bolts 16, the bracket member 14 being provided with a hollow socket sleeve 18.

A steering column generally indicated at 20 includes a pair of tubular housing sections 22 and 24 having bores formed therethrough, the upper housing section 22 being secured firmly to the socket member 18 and extending through the firewall into the driver's compartment for supporting at its upper end the steering wheel 26. The lower end of the steering column 20 has its housing section 24 extending downwardly and secured at its lower end, (not shown) to the usual steering box in any well known manner, the steering box containing worm gearing by which the steering of the car is accomplished.

As shown in the views, there is a steering shaft generally indicated at 28, formed in two major steering shaft sections 30 and 32, the upper section 30 extending through the bore of upper housing section 22 and the lower section 32 extending through the lower housing section 24. It is seen that the inside diameters of the tubular housing sections 22 and 24 are substantially greater than the diameter of the steering shaft sections 30 and 32, and to maintain them concentric, suitable bearings or bushings 36 and 38 are provided to permit free rotation of the steering shaft sections in the tubular housing sections on rotation of the steering wheel 26.

It is to be noted that under normal driving conditions, the steering shaft sections 30 and 32 are in axial alignment, as shown, in FIGURES 1, 2, 3 and 5, and their enclosing tubular housing sections 22 and 24 are similarly in axial alignment. However as a safety measure the construction is such as to block rearward movement of the steering box as in a collision with a fixed object or another vehicle and consequent rearward movement of the lower steering shaft section and its enclosing tubular housing section 24, from pushing the upper steering shaft section 30 and its tubular housing section 22 rearwardly toward the driver of the car. Should this occur, a collision with customary construction of the steering column and shaft would tend to injure the driver and possibly impale him on the shaft extending into and through the steering wheel 26. With the present construction, such injury to the driver is avoided by use of the two part steering column arrangement shown.

For this purpose of safety, spacing is provided between the upper end of the lower steering shaft section 32 and the lower end of the upper steering shaft section 30. A pair of connecting link members 40 are disposed on opposite sides of the spaced shaft sections 30 and 32, as seen best in FIGURE 5, and they are interconnected at their ends by means of transverse pivot pins 42 seen as extending through longitudinal slots 44 formed diametrically through each of the steering shaft sections, and extending from near their outer ends a suitable distance therefrom as shown, to permit axial movement of the pins 42 therealong as needed.

From the above, it is clear that both steering shaft sections 30 and 32 are operatively connected together by means of the two links 40 for rotation together about the axis of the steering shaft, so that rotation of the steering wheel 26 causes both shaft sections to rotate together for steering the vehicle. It is also to be noted that normally the two shaft sections are mutually spaced from each other as seen best in FIGURES 3 and 5, the spacing being somewhat exaggerated for purposes of clarity of illustration. It is also seen that cam surfaces 46 and 48 are formed on the ends of the shaft sections so that if there is a collision which forces the shaft section 32 toward the section 30, this will not result in section 32 pushing upon the upper shaft section 30, but rather section 32 will be subjected to a camming action, sliding off the cam surface 46 and thrown to the left as seen in FIGURE 3, to a position out of contact therewith, as seen in FIGURE 4 approximately.

The connecting links 40 being merely pivoted on pins 42 in slots 44 of their respective steering shaft sections, will allow their pins to slide in their slots, so that as shaft section 32 approaches section 30, it is cammed away therefrom and hence no push or power can be transmitted from section 32 to section 30. Hence a collision pushing the steering gear box and shaft 32 to the rear will not push shaft 30 to the rear and hence no danger to the driver by rearward movement of the steering column or wheel 26 can result.

While a suitable type of complementary cam surfaces is shown in FIGURE 3 at 46 and 48, it is understood that this is by way of example, and that other cam shapes may also be used, depending upon the amount of camming action desired, and the extent of throw-out of the shaft section 32 from axial alignment desired upon impact with a colliding object of the vehicle. Similarly, the length of the slots 44 is chosen to fit the needs of the mechanical configuration and as to allow free axial movement until camming engagement results.

The hollow tubular housing sections 22 and 24 are also provided with interspacing as seen in FIGURES 2, 3 and 5, at their adjacent ends, and are provided with pairs of diametrically opposed longitudinally extending slots 50 to slidably receive pivot pins 52 which extend therethrough and through the end portions of connecting link members 54 which are thus connected thereto and hence interconnect the two tubular housing sections 22 and 24. It is seen that if on a collision tubular housing section 24 is pushed rearwardly, the pins 52 sliding in their slots 50 will allow the movement until camming action results from cam surfaces 46 and 48, and that then not only is the shaft section 32 cammed violently and quickly out of alignment as in FIGURE 4, but also the tubular housing 24 is also thrown therewith out of axial alignment, so that no push or thrust is effected on shaft 30, tubular section 22 or the steering wheel 26.

As shown, a flexible tube or sleeve member 56 may be disposed over the linked portions of the steering shafts and tubular housings, being secured to the tubular housings by means of screws 60 threaded into the housings and spaced therefrom by means of spacing washers or collars or bushings 62. The flexible sleeve 56 is made of suitable material which may be transparent plastic for example to permit inspection therethrough for alignment, and while fairly rigid normally, is adapted to yet yield in response of and to any throwing out of alignment of the shafts or housings upon collision impact so as to interpose no obstacle to adequate throw-out of alignment thereupon.

It is thus seen that this presents a distinct safety feature for protection of the driver of a motor vehicle when there is a collision with another vehicle or a fixed object such a tree, wall or the like, preventing the collision from pushing the upper end of the steering column and the steering wheel toward the driver. The steering shaft and tubular housing sections are initially placed in longitudinal axial alignment as seen in FIGURES 1, 2, 3 and 5, and the car is steered in the usual manner by rotation of steering wheel 26. In the event of a collision which tends to push the steering gear box and lower shaft section 32 rearwardly toward the driver, the lower shaft section 32 and tubular housing 24 will move rearwardly until there is camming engagement between cam surfaces 48 and 46, whereupon there is an instantaneous camming action throwing the shaft section 32 and tubular housing 24 to the left as seen in FIGURE 3 to the approximate completely disaligned position as seen in FIGURE 4, no rearward thrust on shaft section 30, tubular housing 22 or the steering wheel 26 being possible, and the driver being protected.

It is to be noted that the diameter of the tubular housing sections 22 and 24 is sufficiently great as to avoid blocking buckling action permissible to the links 40 and 54 regardless of whether or not the links lie in parallel planes.

Although the invention has been described and illustrated in specific detail herein, it is understood that this is only by way of illustrative example and not by way of limitation, and that various changes may be made in size, shape, materials and arrangement without departing from the spirit of the invention as claimed:

I claim:

1. A steering column device for a vehicle and the like, comprising steering shaft means engageable at one end with a steering gear linkage of a vehicle for actuating the same to steer said vehicle and engageable at another end with a steering wheel of said vehicle for being rotatably actuated by rotation of said steering wheel, hollow tubular housing means having a longitudinal passageway formed therethrough for receiving said steering shaft means for rotation therein, and positive safety means constructed and arranged for blocking rearward movement toward the vehicle operator of said steering shaft means as its end engageable with said steering wheel upon forceable rearward impact movement of said steering shaft means and engageable with said steering gear linkage, and wherein said steering shaft means comprises a first steering shaft section engageable with said vehicle steering linkage at its outer end, and a second steering shaft section engageable with said vehicle steering wheel at its outer end for rotation thereby, said first and second steering shaft sections being normally in mutual axial alignment for rotation together, and normally mutually interspaced at their inner ends, linkage means interconnecting said steering shaft sections at their adjacent inner ends for rotation together when in axial alignment, and positive engaging cam means carried by said inner ends of said steering shaft sections and normally out of cam contact with each other, and constructed and arranged so that upon collision impact or the like resulting in rearward movement of said first steering shaft section to bring said cam means into contact with each other said resultant cam action throws said steering shaft sections out of mutual axial alignment with each other so as to block rearward movement of said second shaft section and said steering wheel by said rearward movement of said first shaft section.

2. The construction according to claim 1, and wherein said hollow tubular housing means comprising first and second tubular housing sections and wherein said first steering shaft section extends through said first tubular housing section for rotation therein, and wherein said second steering shaft section extends through said second tubular housing section for rotation therein, and tubular housing connecting means interconnecting said first and second tubular housing sections substantially in the vicinity of said means interconnecting said first and second steering shaft sections, and movable when said shaft sections are cammed out of mutual axial alignment on impact collision for allowing said adjacent portions of said tubular housing sections to be thrown correspondingly out of mutual axial alignment with each other.

3. The construction according to claim 1, and wherein said positive engaging cam means comprises first and second cooperating cam surface portions carried respectively on the inner ends of said first and second shaft sections, and so constructed and arranged that any resultant cam force applied on axial movement of said first shaft section toward and into contact with said second shaft section is converted into a total sidewise thrust of said first shaft section away from said second shaft section through said cam action so as to through said cam action instantaneously throw said first shaft section out of axial alignment with said second shaft section automatically and positively for safety disengagement of said second shaft section from said first shaft section to block rearward displacement of said steering wheel toward said vehicle operator upon collision impact of said vehicle.

4. The construction according to claim 2, and wherein there is outer casing means extending over and connected to both said first and second tubular housing sections for covering the said interconnected portions of said shaft sections and housing sections, said outer casing means being formed of hollow flexible yieldable material for yielding upon said axial displacement of said shaft sections accommodatingly to said displacement.

References Cited

UNITED STATES PATENTS 2,548,244    4/1951    Stein _____ 74—492

FRED C. MATTERN, JR., *Primary Examiner.*

CAROLYN F. GREEN, *Assistant Examiner.*